US010670686B2

(12) United States Patent
Akanoma et al.

(10) Patent No.: US 10,670,686 B2
(45) Date of Patent: Jun. 2, 2020

(54) POSITION SPECIFYING DEVICE, TRANSMITTER, AND NON-TRANSITORY RECORDING MEDIUM

(71) Applicant: NTT TechnoCross Corporation, Tokyo (JP)

(72) Inventors: Nobuyuki Akanoma, Tokyo (JP); Yasuyuki Takahata, Tokyo (JP); Kazuo Fukaya, Tokyo (JP)

(73) Assignee: NTT TechnoCross Corporation, Tokyo (JP)

( * ) Notice: Subject to any disclaimer, the term of this patent is extended or adjusted under 35 U.S.C. 154(b) by 20 days.

(21) Appl. No.: 16/164,912

(22) Filed: Oct. 19, 2018

(65) Prior Publication Data

US 2019/0049546 A1    Feb. 14, 2019

Related U.S. Application Data

(63) Continuation of application No. PCT/JP2016/063186, filed on Apr. 27, 2016.

(51) Int. Cl.
| *G01S 3/28* | (2006.01) |
| *G01S 3/18* | (2006.01) |
| *G01S 5/02* | (2010.01) |
| *H04M 11/00* | (2006.01) |

(52) U.S. Cl.
CPC ............................ *G01S 3/28* (2013.01); *G01S 3/18* (2013.01); *G01S 5/02* (2013.01); *H04M 11/00* (2013.01)

(58) Field of Classification Search
CPC ..... G01S 1/02; G01S 3/28; G01S 3/18; G01S 3/14; G01S 3/06; G01S 3/143; G01S 3/043; H04M 11/00

USPC ......................................................... 342/432
See application file for complete search history.

(56) References Cited

U.S. PATENT DOCUMENTS

| 8,723,730 | B2 | 5/2014 | Lu et al. |
| 2005/0246334 | A1 | 11/2005 | Tao et al. |
| 2012/0220315 | A1 | 8/2012 | Karttaavi et al. |
| 2014/0135042 | A1 | 5/2014 | Buchheim et al. |
| 2016/0047885 | A1* | 2/2016 | Wang .................. G01S 3/74 342/442 |

(Continued)

FOREIGN PATENT DOCUMENTS

| JP | H08-248116 | 9/1996 |
| JP | 2014-182021 | 9/2014 |

(Continued)

OTHER PUBLICATIONS

International Search Report for PCT/JP2016/063186 dated Jul. 19, 2016.

(Continued)

*Primary Examiner* — Harry K Liu
(74) *Attorney, Agent, or Firm* — IPUSA, PLLC

(57) ABSTRACT

A position specifying device communicable with a transmitter supporting Bluetooth Low Energy (BLE) is provided. The position specifying device includes: a signal receiving unit configured, by using multiple antennas each having different directivity, to receive BLE radio signals transmitted from the transmitter and to measure respective receiving strengths of the BLE radio signals; and a specifying unit configured to specify a position of the transmitter by comparing the respective receiving strengths measured via each of the multiple antennas.

4 Claims, 8 Drawing Sheets

(56) References Cited

U.S. PATENT DOCUMENTS

| | | | |
|---|---|---|---|
| 2016/0094947 A1* | 3/2016 | Shen | H04W 4/023 455/456.1 |
| 2016/0183045 A1* | 6/2016 | Chen | H04W 4/80 455/456.1 |
| 2018/0252528 A1* | 9/2018 | Zhuang | G01S 5/02 |

FOREIGN PATENT DOCUMENTS

| | | |
|---|---|---|
| JP | 2014-235044 | 12/2014 |
| JP | 2014-239393 | 12/2014 |
| JP | 2015-195433 | 11/2015 |
| JP | 2015-195467 | 11/2015 |

OTHER PUBLICATIONS

Extended European Search Report for 16900423.1 dated Nov. 27, 2019.

* cited by examiner

FIG.1
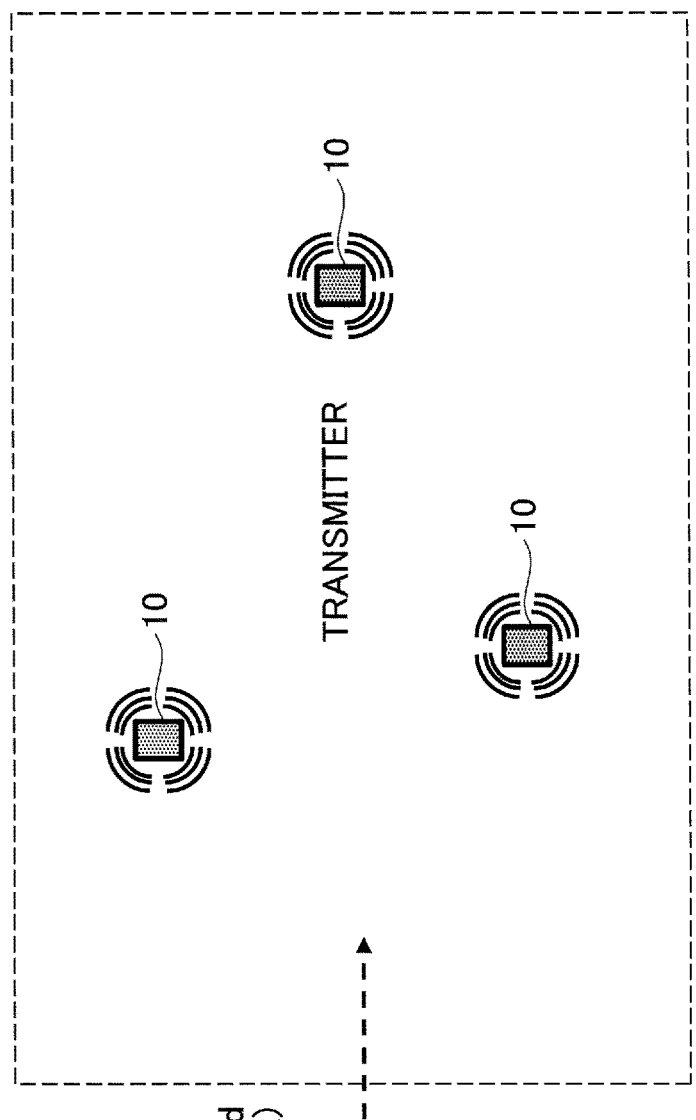
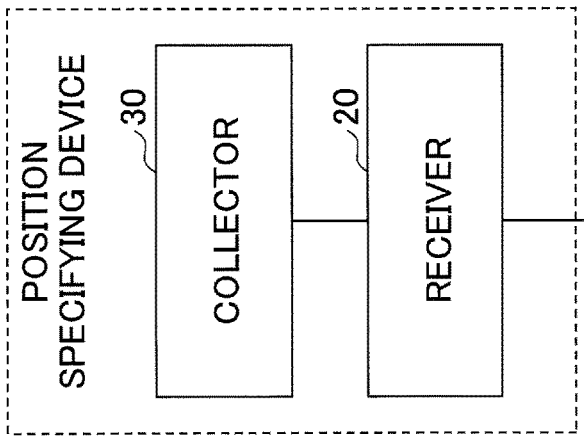

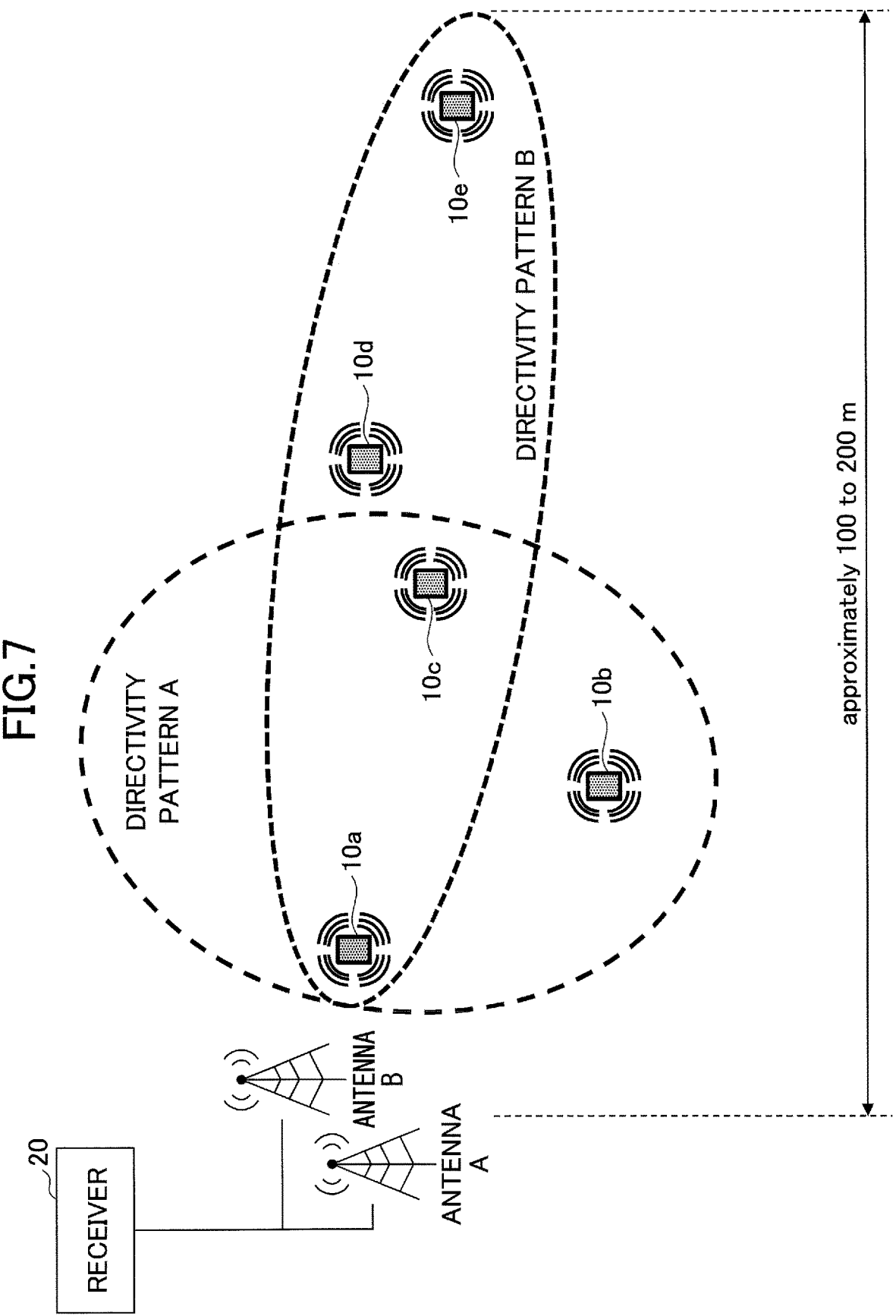

POSITION SPECIFYING DEVICE, TRANSMITTER, AND NON-TRANSITORY RECORDING MEDIUM

CROSS-REFERENCE TO RELATED APPLICATION

This application is a continuation of International Application No. PCT/JP2016/063186 filed on Apr. 27, 2016 and designated the U.S., the entire contents of which are incorporated herein by reference.

TECHNICAL FIELD

This invention relates to a position specifying device and a transmitter.

BACKGROUND ART

Technology called BLE (Bluetooth (registered trademark) Low Energy) is known. BLE is an enhanced technology of Bluetooth (registered trademark) which is a wireless communication technology for short distance, and BLE enables extremely power-efficient communication. A service for distributing a coupon by using BLE technology is available. In the service, a transmitter for transmitting an advertisement using BLE is placed in a location such as a store, and by activating a predetermined application program in a smartphone that has detected the advertisement, the coupon is received by the smartphone.

An example of conventional technique utilizing BLE is disclosed in Patent Document 1.

As a transmitter or a receiver supporting BLE is assumed to communicate with each other within a short distance of 15 to 20 meters, it is difficult for a receiver (such as a smartphone) to receive a radio wave transmitted from a transmitter at a remote location. Further, as a radiation pattern of a radio wave emitted from a transmitter is omnidirectional, it is difficult for a receiver to detect a direction in which the transmitter is positioned.

PRIOR-ART DOCUMENT

Patent Document

[Patent Document 1] Japanese Laid-Open Patent Publication No. 2015-195433

SUMMARY OF INVENTION

According to the present disclosure, a position specifying device communicable with a transmitter supporting Bluetooth Low Energy (BLE) is provided. The position specifying device includes: a signal receiving unit configured, by using multiple antennas each having different directivity, to receive BLE radio signals transmitted from the transmitter and to measure respective receiving strengths of the BLE radio signals; and a specifying unit configured to specify a position of the transmitter by comparing the respective receiving strengths measured via each of the multiple antennas.

BRIEF DESCRIPTION OF DRAWINGS

FIG. 1 is a diagram illustrating an example of a configuration of a position management system according to a first embodiment;

FIG. 7 is a diagram illustrating a method of specifying a position of the transmitter;

DETAILED DESCRIPTION OF THE PREFERRED EMBODIMENTS

The present invention aims at providing a technique for enabling detection of a position of a transmitter by using a generic and power-efficient wireless technology such as BLE. Embodiments of the present invention will be described below with reference to the drawings. Note that the embodiments that will be described below are simply examples, and embodiments to which the present invention may be applied are not limited to the following embodiments.

First Embodiment

<System Configuration and Overview>

FIG. 1 is a diagram illustrating an example of a configuration of a position management system according to a first embodiment. The position management system includes one or more transmitters 10, a receiver 20, and a collector 30.

The transmitter 10 supports BLE (Bluetooth Low Energy), and has a function for communicating with the receiver 20 using a BLE radio signal. The transmitter 10 can transmit an ID for uniquely identifying the transmitter and various types of data (such as a state of the transmitter 10 and output values of various sensors), using the BLE radio signal. The transmitter 10 may be an isolated transmitting device, or a device attached to an object (such as luggage), a person, or an animal.

The receiver 20 has a function for communicating with the transmitter 10 using a BLE radio signal. Also, to the receiver 20, multiple antennas each having different directivity can be connected. The receiver 20 has a function of determining an antenna which is used for receiving a BLE radio wave and measuring receiving strength of the received BLE signal. The receiver 20 also transmits, to the collector 30, information including an antenna used for receiving a BLE radio signal, receiving strength of the BLE radio signal, and an ID of the transmitter 10 which sends the BLE radio wave (hereinafter, the information may be referred to as "transmitter information").

The collector 30 has a function for storing the transmitter information sent by the receiver 20 to a database or the like. The collector 30 also has a function for specifying a position of each transmitter 10, based on receiving strength for each antenna which is included in the collected transmitter information.

The receiver 20 and the collector 30 may be unified into a single apparatus (position specifying device), or may be respective isolated devices.

<Functional Configuration>
(Transmitter)

Figure 2:
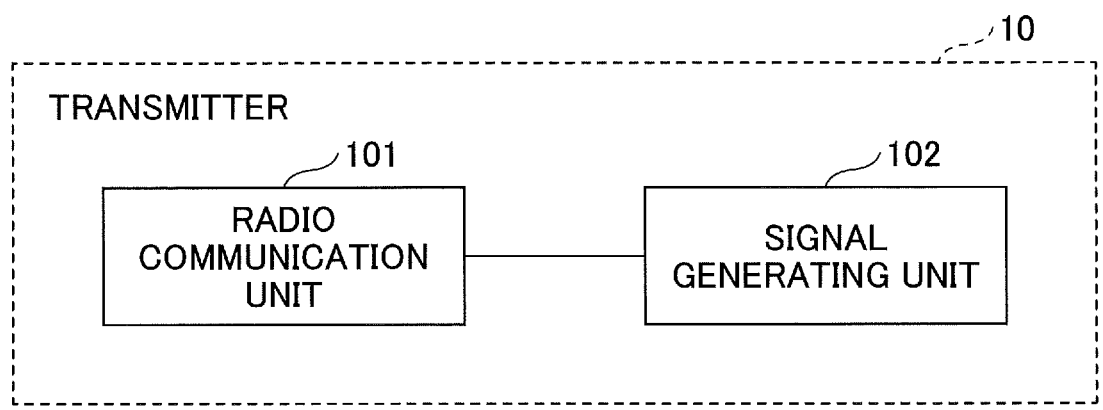
FIG. 2 is a diagram illustrating an example of a functional configuration of a transmitter according to the first embodiment.

FIG. 2 is a diagram illustrating an example of a functional configuration of the transmitter according to the first embodiment. The transmitter 10 according to the first embodiment includes a radio communication unit 101 and a signal generating unit 102.

The radio communication unit 101 is configured to transmit a BLE signal generated by the signal generating unit 102 by radio. The signal generating unit 102 is configured to generate a BLE signal to be transmitted from the radio communication unit 101.

(Receiver)

Figure 3:
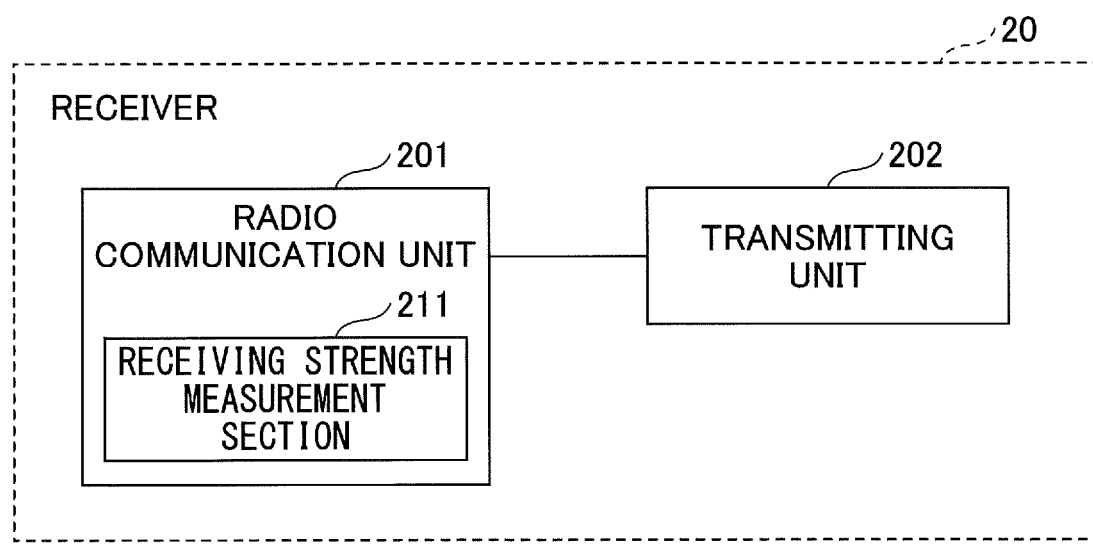
FIG. 3 is a diagram illustrating an example of a functional configuration of a receiver according to the first embodiment.

FIG. 3 is a diagram illustrating an example of a functional configuration of the receiver according to the first embodiment. The receiver 20 according to the first embodiment includes a radio communication unit 201 and a transmitting unit 202. Further, the radio communication unit 201 includes a receiving strength measurement section 211.

The radio communication unit 201 is configured to receive BLE radio signals transmitted from the transmitter 10 via the multiple antennas each having different directivity. The radio communication unit 201 is also configured to select an antenna to be used for receiving the BLE radio signal, among the multiple antennas connected to the receiver 20 each having different directivity. The receiving strength measurement section 211 is configured to measure receiving strength (such as RSSI (Receiving Signal Strength Indicator)) of a BLE radio signal. The transmitting unit 202 is configured to transmit, to the collector 30, the transmitter information including an antenna used for receiving a BLE radio wave, receiving strength of the BLE radio wave, and an ID of the transmitter 10 which sends the BLE radio wave.

(Collector)

Figure 4:
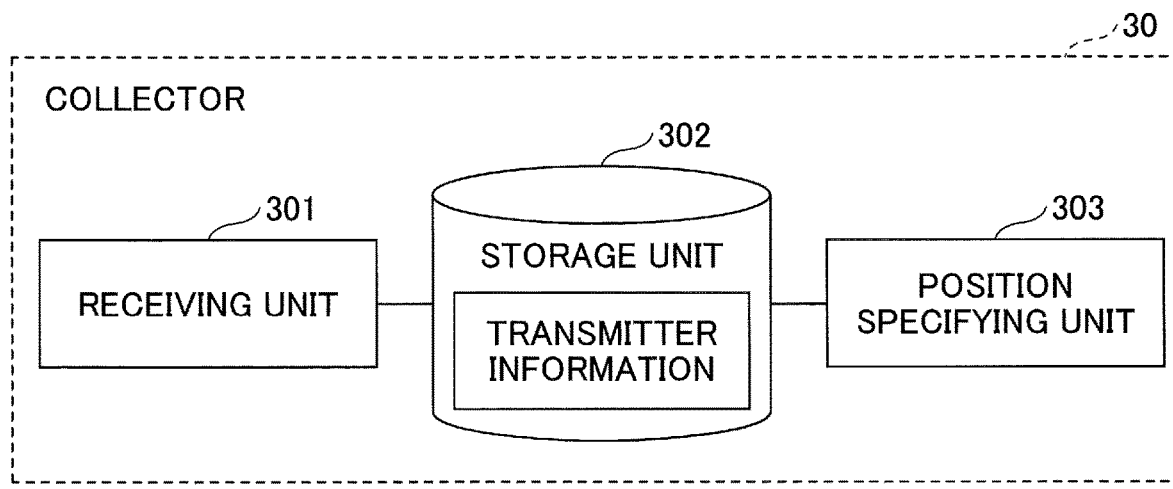
FIG. 4 is a diagram illustrating an example of a functional configuration of a collector according to the first embodiment.

FIG. 4 is a diagram illustrating an example of a functional configuration of the collector according to the first embodiment. The collector 30 according to the first embodiment includes a receiving unit 301, a storage unit 302, and a position specifying unit 303. The receiving unit 301, the storage unit 302, and the position specifying unit 303 may be embodied by different computers respectively. Alternatively, functions of the receiving unit 301, the storage unit 302, and the position specifying unit 303 may be further distributed to more than three computers. That is, the collector 30 may be embodied by one or more computers. Further, each of the one or more computers may be a virtual server implemented by virtualization technology, or may be a virtual server on the cloud.

The receiving unit 301 is configured to receive transmitter information from the receiver 20 and to store the transmitter information into the storage unit 302. The position specifying unit 303 is configured to extract the transmitter information of a specific transmitter 10, and to specify a position of the specific transmitter 10 of which the transmitter information is extracted, by comparing receiving strengths of signals received by the multiple antennas. Detailed method will be described below.

<Hardware Configuration>

Figure 5:
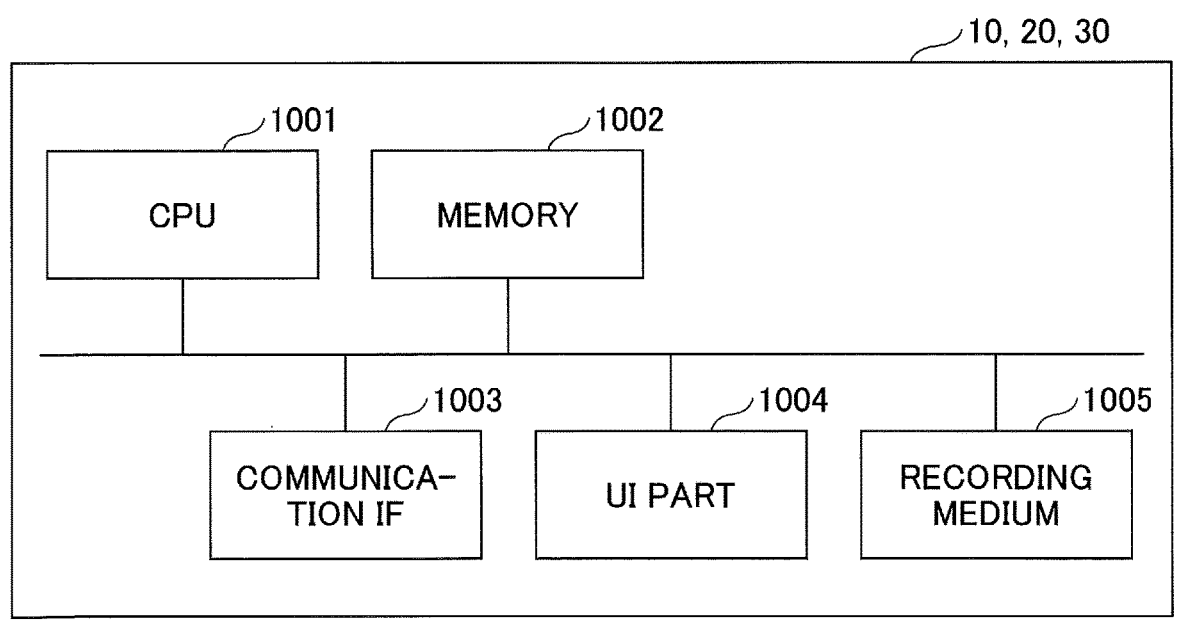
FIG. 5 is a diagram illustrating an example of a hardware configuration of the transmitter, the receiver, or the collector according to the first embodiment.

FIG. 5 is a diagram illustrating an example of a hardware configuration of the transmitter, the receiver, or the collector according to the first embodiment. Each of the transmitter 10, the receiver 20, and the collector 30 includes a CPU 1001, a memory 1002, a communication interface (IF) 1003, and a user interface (UI) part 1004.

The CPU 1001 is a processor performing an overall control of the transmitter 10, the receiver 20, or the collector 30. The CPU 1001 is configured to execute programs such as an operating system and an application program stored in the memory 1002 or the like, to embody processes of each functional unit in the transmitter 10, the receiver 20, or the collector 30. The memory 1002 stores programs for embodying the processes of each of the functional units in the transmitter 10, the receiver 20, or the collector 30, and data used by the programs. The memory 1002 is also used as a memory area for loading the programs, or as a work area for the loaded programs. The communication IF 1003 is a communication interface for sending or receiving data via a radio network or a wired network. The UI part 1004 is a user interface for receiving an input operation from a user, and for displaying various types of information. Note that the transmitter 10, the receiver 20, and the collector 30 may be configured to be capable of connecting a non-transitory recording medium 1005. Examples of the recording medium include a magnetic recording medium, an optical disc, a magneto-optical recording medium, and a non-volatile memory. Programs for embodying the processes of each of the functional units in the transmitter 10, the receiver 20, or the collector 30 can be stored in the recording medium.

<Example of Operation of Position Management System>

Figure 6:
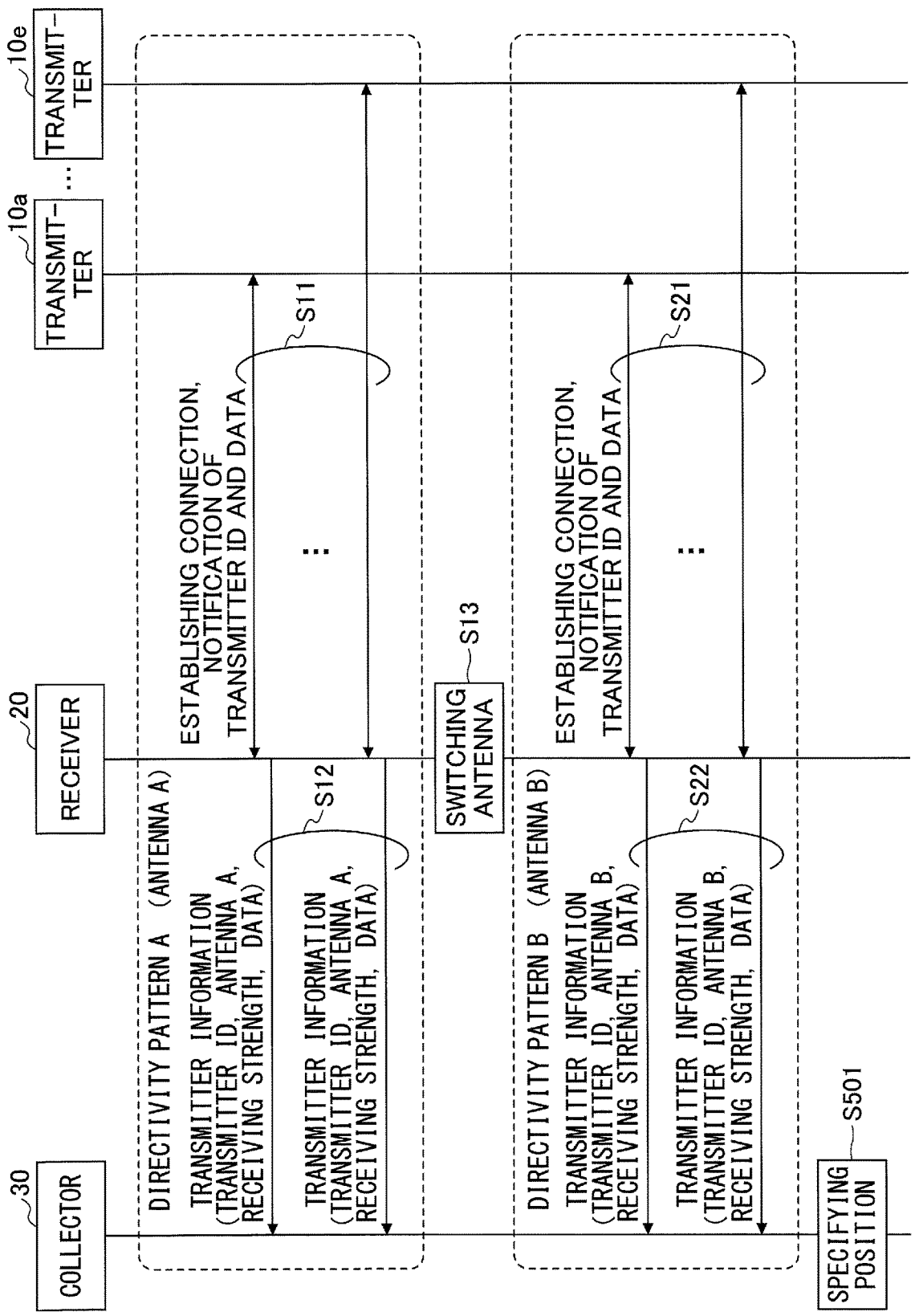
FIG. 6 is a sequence diagram illustrating an example of an operation of the position management system according to the first embodiment.

FIG. 6 is a sequence diagram illustrating an example of an operation of the position management system according to the first embodiment. An operation in which the position management system specifies a position of the transmitter 10 will be described with reference to FIG. 6. Note that an antenna A and an antenna B are connected to the receiver 20. Each of the antenna A and the antenna B has different directivity, and the antenna A and the antenna B have a directivity pattern A and a directivity pattern B respectively. The antenna A is a flat antenna, for example, and has a directivity pattern of a wide beam width. The antenna B is a Yagi antenna, for example, and has a directivity pattern of a narrow beam width. Also, because the antenna B has a narrow beam width and has high gain, it is assumed that the antenna B can receive a radio signal from a further location (for example, 100 to 200 m away). The present example of operation describes a case in which five transmitters 10 (10*a* to 10*e*) are present, and in which the transmitters 10 (10*a* to 10*e*) are located at positions illustrated in FIG. 7.

At step S11, the radio communication unit 201 in the receiver 20 switches an antenna to be used to the antenna A, receives a BLE radio signal transmitted from each of the transmitters 10, and obtains an ID of each of the transmitters 10 contained in the BLE radio signal. Also, the receiving strength measurement section 211 measures receiving strength of the BLE radio signal transmitted from each of the transmitters 10. Next, the radio communication unit 201 establishes connection with each of the transmitters 10, and receives data from each of the transmitters 10. The data contains, for example, a status (such as a remaining amount of a battery) of the transmitter 10, output values of various sensors in the transmitter 10 (or connected to the transmitter 10), and the like.

At step S12, the transmitting unit 202 in the receiver 20 transmits the transmitter information, for each transmitter 10, to the collector 30. The receiving unit 301 in the collector 30 stores the transmitter information received from the receiver 20 into the storage unit 302. The transmitter information includes an ID of a transmitter, information for identifying an antenna used for receiving a radio signal ("antenna A" at this step), receiving strength of the radio signal, and data received from the transmitter 10. If, at step S11, a radio signal is not received from a certain transmitter 10, or if an ID of the transmitter 10 cannot be obtained because of low receiving quality of a radio signal, the transmitter information of the transmitter 10 is not transmitted to the collector 30.

At step S11, the radio communication unit 201 switches an antenna to be used from the antenna A to the antenna B, and receives a BLE radio signal transmitted from each of the transmitters 10. Note that the switching of the antenna may be performed by the radio communication unit 201, or performed by a user.

Operations performed at step S21 and step S22 are the same as the operations performed at step S11 and step S12 respectively, except that an antenna to be used is different. Thus, because the operations performed by the radio communication unit 201 are the same, specific descriptions about step S21 and step S22 will be omitted.

At step S501, the position specifying unit 303 in the collector 30 specifies a position of each of the transmitters 10a to 10e, based on the transmitter information of each of the transmitters 10a to 10e.

A concrete method of specifying a position of each of the transmitters 10a to 10e will be described with reference to FIG. 7. In the following description with reference to FIG. 7, magnitude of receiving strength is expressed by using a word of "large", "moderate", or "small" for convenience. However, receiving strength represented by a numerical value in a unit of, for example, milliwatt (mW) or dBm, may be stored in the transmitter information.

In a case in which the antenna A having the directivity pattern A is used for receiving a radio signal, receiving strength of a radio signal from the transmitter 10a is large because the transmitter 10a is positioned in vicinity of the antenna A. Similarly, because the transmitter 10b is positioned in a location slightly apart from the antenna A within a range of the directivity pattern A, receiving strength of a radio signal from the transmitter 10b is moderate. Further, because the transmitter 10c is positioned in a location apart from the antenna A within the range of the directivity pattern A, receiving strength of a radio signal from the transmitter 10c is small. With respect to the transmitters 10d and 10e, because the transmitters 10d and 10e are too far from the antenna A, a radio signal from the transmitter 10d or 10e cannot be received by the antenna A (that is, the antenna A cannot detect presence of the transmitter 10d or 10e). As described above, when step S11 and step S12 have been performed, the transmitter information of each of the transmitters 10a to 10c is stored in the collector 30, and the receiving strengths contained in the respective transmitter information of the transmitters 10a to 10c are "large", "moderate", and "small", respectively.

Next, in a case in which the antenna B having the directivity pattern B is used for receiving a radio signal, receiving strength of a radio signal from the transmitter 10a is large because the transmitter 10a is positioned in vicinity of the antenna B within a range of the directivity pattern B. Similarly, because the transmitters 10c and 10d are positioned within the range of the directivity pattern B but are at a location slightly apart from the antenna B, receiving strength of a radio signal from the transmitter 10c and receiving strength of a radio signal from the transmitter 10d are moderate. Similarly, because the transmitter 10e is positioned within the range of the directivity pattern B but is at a location apart from the antenna B, receiving strength of a radio signal from the transmitter 10e is small. Conversely, because the transmitter 10b is out of the range of the directivity pattern of the antenna B, a radio signal from the transmitter 10b cannot be received by the antenna B (that is, the antenna B cannot detect presence of the transmitter 10b). As described above, when step S21 and step S22 have been performed, the transmitter information of each of the transmitters 10a, 10c, 10d, and 10e is stored in the collector 30, and the receiving strengths contained in the respective transmitter information of the transmitters 10a, 10c, 10d, and 10e are "large", "moderate", "moderate", and "small", respectively.

As described above, receiving strength of a radio signal from the transmitter 10a which is obtained by using the antenna A is "large", and receiving strength of a radio signal from the transmitter 10a which is obtained by using the antenna B is "large". That is, the position specifying unit 303 can specify that the transmitter 10a is positioned in the vicinity of the antenna A and the antenna B. Further, receiving strength of a radio signal from the transmitter 10b which is obtained by using the antenna A is "moderate", and a radio signal from the transmitter 10b cannot be received when the antenna B is used. That is, the position specifying unit 303 can specify that the transmitter 10b is positioned at a location slightly apart from the antenna A within a range of the directivity pattern A, and out of a range of the directivity pattern of the antenna B.

Further, receiving strength of a radio signal from the transmitter 10c which is obtained by using the antenna A is "small", and receiving strength of a radio signal from the transmitter 10c which is obtained by using the antenna B is "moderate". That is, the position specifying unit 303 can specify that the transmitter 10c is positioned at a location apart from the antenna A within the range of the directivity pattern A, and slightly apart from the antenna B within the range of the directivity pattern B. Further, a radio signal from the transmitter 10d cannot be received when the antenna A is used, and receiving strength of a radio signal from the transmitter 10d which is obtained by using the antenna B is "moderate". That is, the position specifying unit 303 can specify that the transmitter 10d is positioned at a location out of a range of the directivity pattern A, and slightly apart from the antenna B within a range of the directivity pattern B. Similarly, a radio signal from the transmitter 10e cannot be received when the antenna A is used, and receiving strength of a radio signal from the transmitter 10e which is obtained by using the antenna B is "small". That is, the position specifying unit 303 can specify that the transmitter 10e is positioned at a location out of a range of the directivity pattern A, and apart from the antenna B within a range of the directivity pattern B.

The first embodiment has been described above. The position management system according to the first embodiment can specify a position of each transmitter 10, by measuring receiving strengths of BLE radio signals by using multiple antennas each having a different directivity pattern. Also, because the position management system can accumulate transmitter information of each transmitter 10 in the collector 30, the accumulated data can be utilized for various types of analysis.

Second Embodiment

Next, a position management system according to a second embodiment will be described. What is not mentioned in the second embodiment may be the same as that in the first embodiment.

Figure 8A:
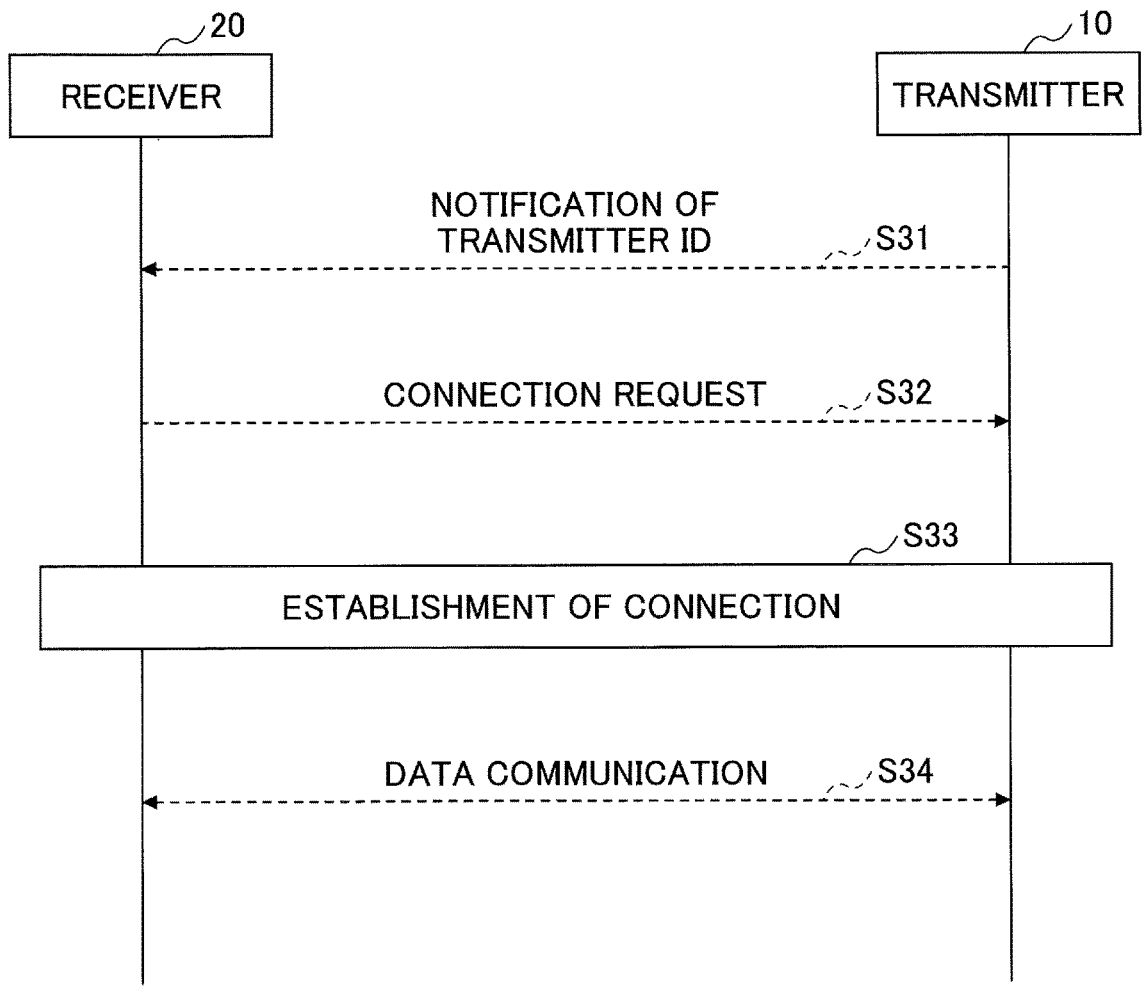
FIG. 8A is a diagram illustrating a data receiving method using conventional BLE.

The above first embodiment describes a case in which a data reception according to the conventional BLE is performed. That is, at step S11 and step S21, the radio communication unit 201 in the receiver 20 receives data from each of the transmitters 10, by establishing connection with each transmitter 10. More specifically, as illustrated in FIG. 8A, the radio communication unit 201 in the receiver 20 receives an ID of the transmitter 10 contained in an advertising signal (may also be referred to as an advertising packet) for BLE (S31), and by transmitting a connection request to the transmitter 10 having the ID (S32), connection is established between the receiver 20 and the transmitter 10 (S33). The radio communication unit 201 in the receiver 20 receives data from the transmitter 10 by using the established connection (S34).

Figure 8B:
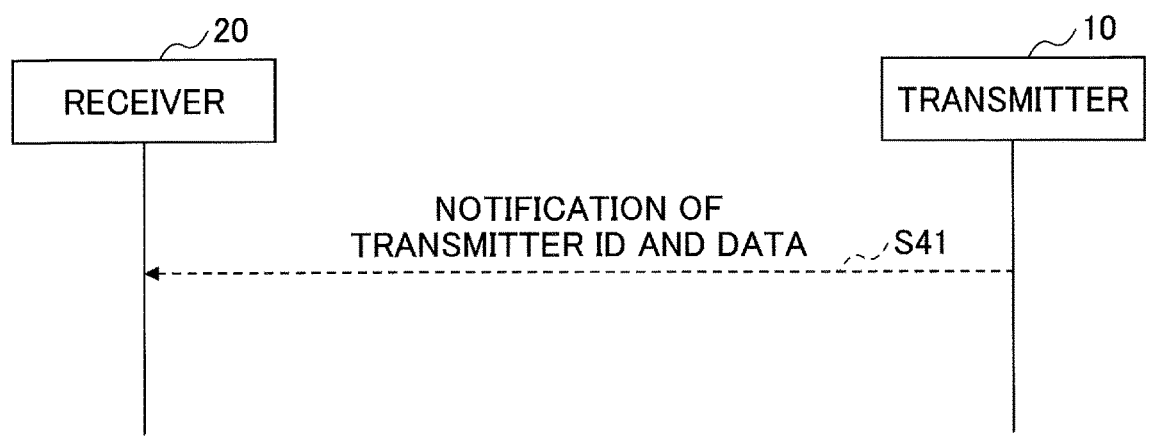
FIG. 8B is a diagram illustrating a data receiving method according to a second embodiment.

In the second embodiment, by using an advertising signal modified from the advertising signal for BLE, the radio communication unit 201 in the receiver 20 can receive data from each of the transmitters 10 without establishing connection with the transmitters 10. More specifically, as illustrated in FIG. 8B, the transmitter 10 transmits an advertising signal containing an ID of the transmitter 10 and data to be transmitted. The radio communication unit 201 in the receiver 20 can receive the ID of the transmitter 10 and the data simultaneously, by receiving the advertising signal (S41).

<Functional Configuration>
(Transmitter)

The radio communication unit 101 is configured to transmit an advertising signal for BLE (may also be referred to as a "BLE advertising signal") generated by the signal generating unit 102 by radio.

The signal generating unit 102 generates the advertising signal for BLE which contains information for identifying the transmitter 10 (an ID of the transmitter 10) and certain information (a state of the transmitter 10 and output values of various sensors), and passes the generated advertising signal to the radio communication unit 101.

Figure 9A:
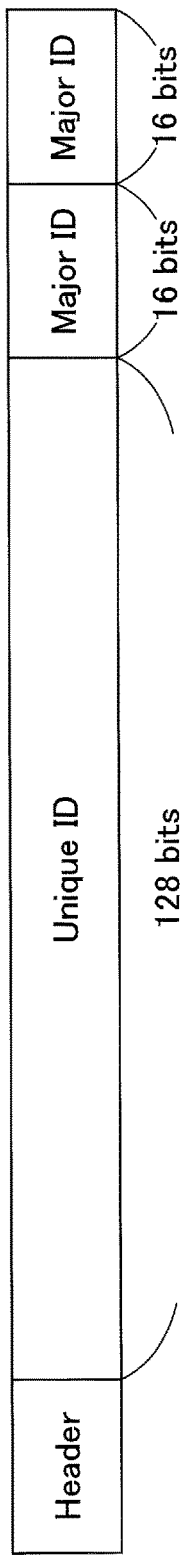
FIG. 9A is a diagram illustrating an example of a format of an advertising signal in the conventional BLE.

An example of a format of the advertising signal generated by the signal generating unit 102 and transmitted by the radio communication unit 101 will be described with reference to FIG. 9A and FIG. 9B. A format of an advertising signal specified in Bluetooth 4.0 and iBeacon (registered trademark) is illustrated in FIG. 9A. A header includes Preamble and Access Address which are specified in Bluetooth 4.0. A "unique ID" is specifically a UUID (Universal Unique Identifier) of 128 bits, and each of a "Major ID" and a "Minor ID" is an identifier of 16 bits. In iBeacon (registered trademark), a set of the "UUID", the "Major ID", and the "Minor ID" is used for uniquely identifying the transmitter 10.

Figure 9B:
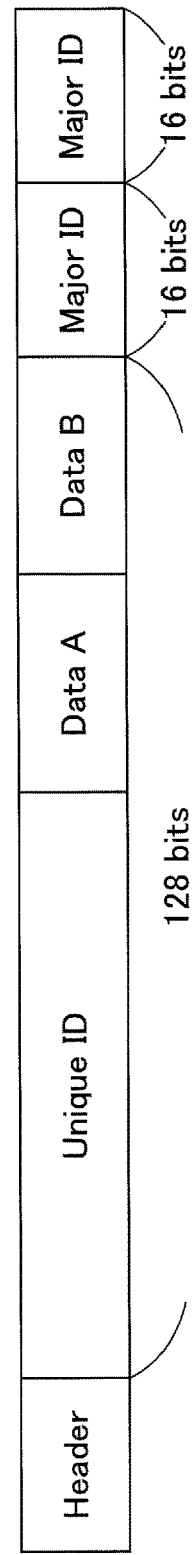
FIG. 9B is a diagram illustrating an example of a format of an advertising signal according to the second embodiment.

A format of the advertising signal used in the second embodiment is illustrated in FIG. 9B. In the second embodiment, among the fields of the advertising signal specified in Bluetooth 4.0 and iBeacon (registered trademark), a format of a 128-bit field for storing a "unique ID" is modified such that data can be stored in the 128-bit field. Although FIG. 9B illustrates a case in which "Data A" and "Data B" are stored in the 128-bit field, the 128-bit field may be configured such that only one data item can be stored, or may be configured such that more than two data items can be stored. Note that, as the information for identifying the transmitter 10 (the ID of the transmitter 10), a set of the "unique ID", the "Major ID", and the "Minor ID", or a set of the "Major ID" and the "Minor ID" may be used. Alternatively, the "unique ID" alone may be used as the information for identifying the transmitter 10.

<Example of Operation of Position Management System>

Figure 10:
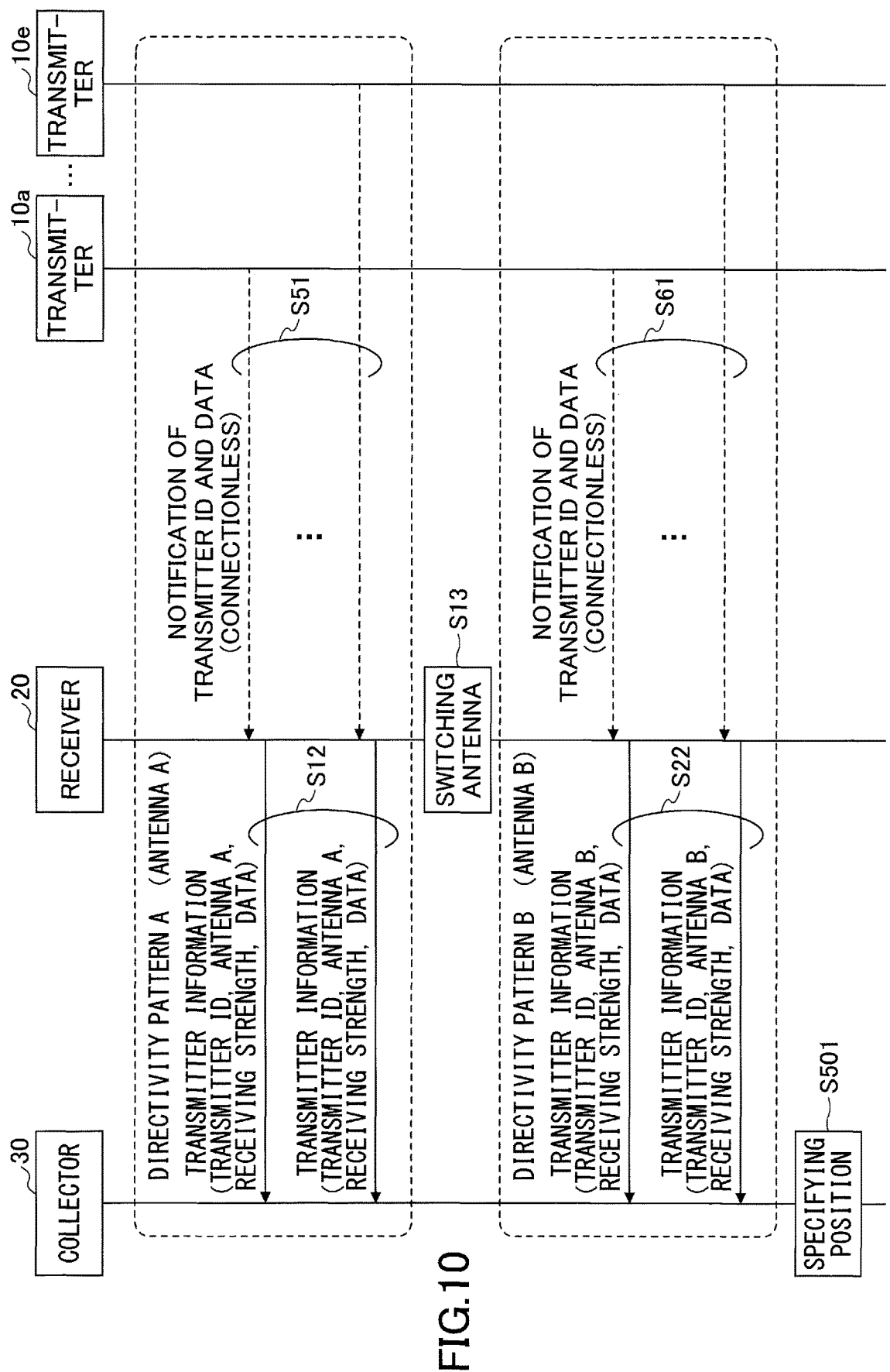
FIG. 10 is a sequence diagram illustrating an example of an operation of a position management system according to the second embodiment.

FIG. 10 is a sequence diagram illustrating an example of an operation of the position management system according to the second embodiment. With respect to a process step in FIG. 10 same as that in FIG. 6, the same reference symbol is assigned, and the description of the process will be omitted.

At step S51, the radio communication unit 201 in the receiver 20 switches an antenna to be used to the antenna A, receives a BLE advertising signal transmitted from each transmitter 10, and obtains an ID of the transmitter 10 and data contained in the BLE advertising signal. The data contains, for example, a status (such as a remaining amount of a battery) of the transmitter 10, output values of various sensors in the transmitter 10 (or connected to the transmitter 10), and the like. Also, the receiving strength measurement section 211 measures receiving strength of the BLE advertising signal transmitted from each of the transmitters 10.

Operations performed at step S61 are the same as those performed at step S51, except that the antenna to be used is different. Thus, detailed descriptions about step S61 will be omitted.

The second embodiment has been described above. The position management system according to the second embodiment can specify a position of each transmitter 10, by measuring receiving strengths of BLE radio signals by using multiple antennas each having a different directivity pattern. Also, because the position management system can accumulate transmitter information of each transmitter 10 in the collector 30, the accumulated data can be utilized for various types of analysis. Further, as the receiver 20 can receive data from each transmitter 10 without establishing connection with the transmitters 10, a processing workload of the receiver 20 can be reduced as compared with the first embodiment.

Because conventional BLE is designed based on a premise that a communication is performed between the receiver 20 and a small number of transmitters 10, the receiver 20 needs to establish connection with each of the transmitters 10 in order to obtain data from the transmitters 10. Accordingly, conventional BLE is not suitable for being applied to management or data collection of a large number of articles in logistics services. Rather, other products such as an active-type RFID product have been suitable for the management or the data collection of a large number of articles. However, as the second embodiment enables data transmission using a BLE advertising signal, the management or the data collection of a large number of articles can be realized by using BLE, which is a more generic technology.

Third Embodiment

Next, a position management system according to a third embodiment will be described. In the third embodiment, the transmitter 10 transmits the BLE advertising signal described in the second embodiment, and the receiver 20 receives the BLE advertising signals transmitted from the transmitter 10, through a single antenna. That is, the third embodiment differs from the second embodiment in that the receiver 20 in the third embodiment receives the BLE advertising signals through a single antenna, whereas the receiver in the second embodiment receives the BLE advertising signals through multiple antennas. What is not mentioned in the second embodiment may be the same as that in the first embodiment. The single antenna employed in the third embodiment may be a flat antenna or a Yagi antenna. However, any types of antennas other than a flat antenna or a Yagi antenna may be used.

<Functional Configuration>

(Transmitter)

Because a functional configuration of the transmitter 10 is the same as that in the second embodiment, description of the transmitter 10 will be omitted.

(Receiver)

The radio communication unit 201 is configured to receive a BLE radio signal transmitted from the transmitter 10 via the single antenna. The receiving strength measurement section 211 is configured to measure receiving strength (such as RSSI) of a BLE radio signal. The transmitting unit 202 is configured to transmit, to the collector 30, the transmitter information including an antenna used for receiving a BLE radio wave, receiving strength of the BLE radio wave, and an ID of the transmitter 10. Note that "the information about an antenna used for receiving a BLE radio wave" may be omitted from the transmitter information.

(Collector)

The receiving unit 301 is configured to receive the transmitter information from the receiver 20 and to store the transmitter information into the storage unit 302. The position specifying unit 303 is configured to extract the transmitter information of a specific transmitter 10, and with respect to the transmitter 10 of which the transmitter information is extracted, to specify a position of the specific transmitter 10 based on the receiving strength. Note that the position specifying unit 303 may be omitted from the collector 30 in the third embodiment. That is, the collector 30 according to the third embodiment may only have a function for accumulating the transmitter information.

<Example of Operation of Position Management System>

In the third embodiment, among operations in FIG. 10, step S13, step S22 and step S61 are omitted.

As operations performed at step S51 and step S12 are the same as those in the second embodiment, description of these steps will be omitted. Note that, at step S12, "the information about an antenna used for receiving a radio wave" may be omitted from the transmitter information.

At step S501, the position specifying unit 303 specifies a position of the transmitter 10, based on the receiving strength contained in the transmitter information. For example, in accordance with magnitude of the receiving strength, the position specifying unit 303 can specify whether the transmitter 10 is in vicinity of an antenna connected to the receiver 20 within a range of a directivity pattern of the antenna, the transmitter 10 is slightly apart from the antenna within the range of the directivity pattern of the antenna, the transmitter 10 is apart from the antenna within the range of the directivity pattern of the antenna, or the transmitter 10 is out of range of the directivity pattern of the antenna. A method of specifying position by the position specifying unit 303 is not limited to the method described above, and the position specifying unit 303 may specify a position in a finer granularity. Note that an operation at step S501 may be omitted.

The third embodiment has been described above. The position management system according to the third embodiment can specify a position of each transmitter 10, by measuring receiving strength of a BLE radio signal by using a single antenna. Also, because the position management system can accumulate transmitter information of each transmitter 10 in the collector 30, the accumulated data can be utilized for various types of analysis. Further, as the receiver 20 can receive data from each transmitter 10 without establishing connection with the transmitters 10, a processing workload of the receiver 20 can be reduced as compared with the first embodiment.

Supplement of Embodiment

The present invention is not limited to the above described embodiments, and various changes or enhancements may be made within a scope of the claims. With respect to operations described in the above embodiments, order of the operations can be changed if no conflict occurs.

The radio communication unit 201 is an example of a signal receiving means (unit). The position specifying unit 303 is an example of a specifying means (unit). The signal generating unit 102 is an example of a generating means (unit). The radio communication unit 101 is an example of a transmitting means (unit).

What is claimed is:

1. A position specifying device communicable with a transmitter supporting Bluetooth Low Energy (BLE), the position specifying device comprising:

a signal receiving unit configured, by using a plurality of antennas each having different directivity, to receive BLE radio signals transmitted from the transmitter and to measure respective receiving strengths of the BLE radio signals; and a specifying unit configured to specify a position of the transmitter by comparing the respective receiving strengths measured via each of the plurality of antennas; wherein the plurality of antennas is a set of a flat antenna and a Yagi antenna.

2. The position specifying device according to claim 1, wherein a BLE radio signal of the BLE radio signals includes an advertising packet containing information for identifying the transmitter and certain data; and the signal receiving unit is configured to obtain the information for identifying the transmitter and the certain data, without establishing connection between the position specifying device and the transmitter.

3. A position management system comprising:

the position specifying device according to claim 1; and a transmitter supporting Bluetooth Low Energy (BLE), including a generating unit configured to generate an advertising packet in accordance with BLE, the advertising packet containing information for identifying the transmitter and certain data; and a transmitting unit configured to transmit the advertising packet generated by the generating unit.

4. A non-transitory computer-readable recording medium storing a computer program to cause a computer to function as the position specifying device communicable with a transmitter supporting Bluetooth Low Energy (BLE), the position specifying device comprising:

a signal receiving unit configured, by using a plurality of antennas each having different directivity, to receive BLE radio signals transmitted from the transmitter and to measure respective receiving strengths of the BLE radio signals; and a specifying unit configured to specify a position of the transmitter by comparing the respective receiving strengths measured via each of the plurality of antennas; wherein the plurality of antennas is a set of a flat antenna and a Yagi antenna.

* * * * *